Patented Mar. 26, 1940

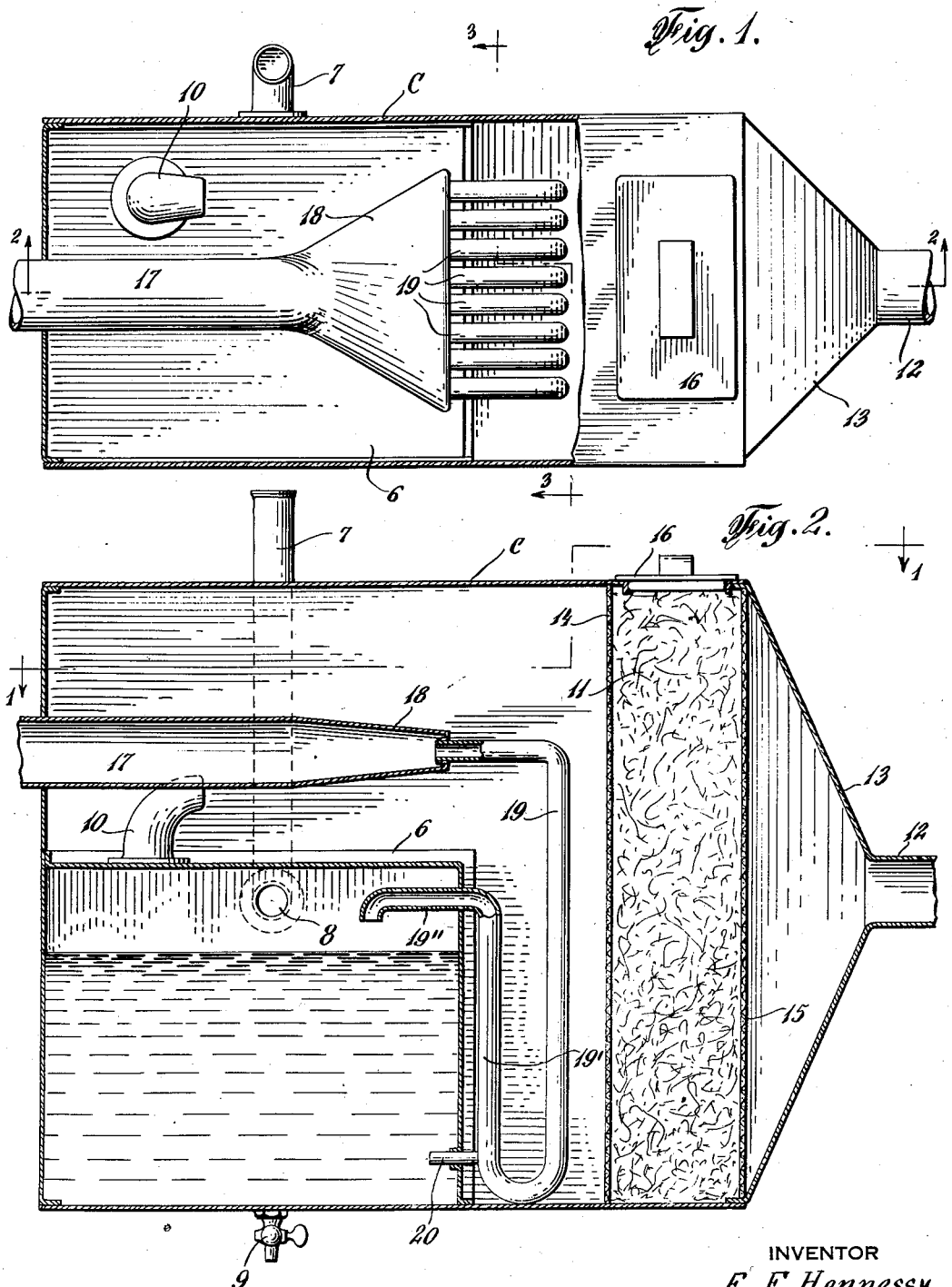

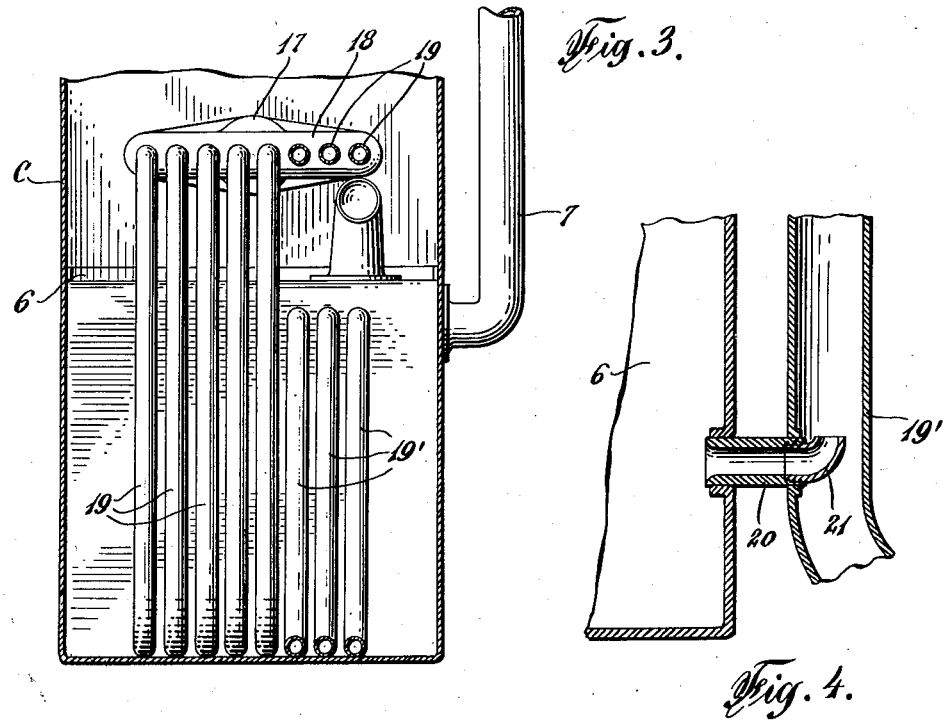

2,195,276

UNITED STATES PATENT OFFICE 2,195,276

MEANS FOR PURIFYING THE GASES OF THE EXHAUSTED PRODUCTS OF COMBUSTION OF INTERNAL COMBUSTION ENGINES

Edward F. Hennessy, Roslyn, N. Y.

Application February 20, 1937, Serial No. 126,840

4 Claims. (Cl. 183—16)

This invention relates to means for use in connection with internal combustion engines to be connected to the outlet of the engine for the exhaust of the products of combustion to purify and deodorize the gases of the exhausted products of combustion.

As is well known the products of combustion exhausted from internal combustion engines utilizing gasolene as a fuel contain gases that are not only noxious and pungent but toxic and deleterious to human health, and when a substance is used in connection or mixed with the gasolene to control combustion of the gasolene and produce what is termed "anti-knock" gasolene the deleterious gases or substances of the exhausted products of combustion are augmented.

It is an object of the invention to provide improved means adapted to be connected to the exhaust outlet for the products of combustion of internal combustion engines to receive and cause the exhausted products of combustion to pass through said means and during the passage therethrough purify and deodorize the products of combustion.

It is another object of the invention to provide improved means for this purpose of unitary structure having an inlet adapted to be connected in communication with the exhaust conduit of an internal combustion engine and including a chamber or container carrying a liquid chemical substance or emulsion, or chemical in solution, having a high boiling point and a low freezing point and the property to absorb noxious and pungent constituents or gases of the products of combustion and/or fix toxic constituents thereof by causing the stream of the products of combustion exhausted from the engine to be divided and subjected to the action of a chemical in a plurality of streams, said means being provided with a chamber in which to receive and expand the products of combustion after they have been subjected to the action of the chemical, and the provision of means through which the products of combustion are successively passed to filter the same.

Other objects and advantages of the invention will hereinafter appear.

In carrying out the invention there is provided a casing having a chamber therein and a container or chamber for a material having the property to purify and deodorize the gases of the products of combustion of internal combustion engines by such gases contacting the material, such as a chemical, chemical emulsion or chemical in solution, the container having an outlet opening into the casing. A main conduit adapted to be connected to the outlet for the products of combustion of an internal combustion engine is extended into the casing and has branch conduits connected thereto, each branch conduit having a connection with the container above the level of the material therein and a by-pass connection with the container below the level of the material to cause a mixing and intimate contacting of the gases of the products of combustion with such material to effect absorption and/or fixing of noxious, pungent and toxic constituents or substances of the gases of the products of combustion in the passage of the same into the chamber, said branch conduits dividing the stream of gases delivered through the main conduit and delivering of the same in a plurality of streams into the container or chamber. The casing has an outlet for the purified gases with means interposed between said outlet and the casing chamber through which the gases are delivered from the casing chamber to the outlet of the casing to effect a filtering of the purified gases before they are delivered from the casing chamber.

In the drawings accompanying and forming a part of this application Figure 1 is a top view of gas purifying and deodorizing means embodying the invention and shown partly in section, the section being taken on the line 1—1 of Figure 2 looking in the direction of the arrows.

Figure 2 is a sectional view taken substantially on the line 2—2 of Figure 1 looking in the direction of the arrows.

Figure 3 is a sectional view taken substantially on the line 3—3 of Figure 1 looking in the direction of the arrows; and Figure 4 is a sectional view to show the by-pass connection of the container or chamber containing the purifying and deodorizing material with a branch conduit leading to said container.

In the embodiment of the invention illustrated in the drawings there is provided a casing C which may be of any desired cross sectional shape and shown as of rectangular shape in cross section and as having greater length and heighth than width. A container or chamber for a material, having both a low freezing and a high boiling point and the property to absorb noxious and toxic constituents of the gases of the products of combustion of an internal combustion engine is provided. While any material having the property to produce the result desired may be utilized, an example of material to produce the result comprises a substance including a fatty compound and an alkali, such as soap or soap powder, in solution of 500 cc. of water and 100 cc. of a vegetable oil, such as cotton seed oil, mixed therewith and then adding water to the mixture to produce approximately two gallons. If desired, a small quantity of phenolphthalein may be mixed with the fatty compound and alkali solution prior to mixing the vegetable oil therewith.

The chamber or container for the chemical may constitute a receptacle mounted in the casing C, or may be, as shown, formed within the casing C by a partition of angular form in longitudinal section extending transversely between the side walls of the casing with one leg of the partition spaced from the forward end of the casing and extending upward from the bottom thereof, and the other leg extending to the forward end wall of the casing C, portions of the front and side walls and bottom of the casing C constituting walls of the chamber or container, as shown at 6. The container 6 is adapted to be filled with the chemical, chemical emulsion or chemical in solution to substantially three-fourths of its capacity to provide an air space in the container above the material, and a suitable gauge or sight glass may be provided to indicate the quantity of the material in the container. The container or chamber 6 has an inlet conduit connected thereto through which to fill the chemical or material into the container, and as shown is connected in communication with the container adjacent the top, as at 18, and extends through and above the top of the casing C and provided with a removable closure. To drain the contents from the container 6 it is provided with a suitable valve controlled outlet, and shown as a valve 9 the casing of which is secured in and opens to the container through the bottom thereof. The purified gases are delivered from the container 6 through an outlet member 10 connected in communication with the top of the container and opening to the chamber in the casing C constituting an expansion chamber for the purified gases, formed by the wall of the container 6 and a wall of fibrous material 11, preferably metallic fibers, such as steel wool or copper, extending transversely of the rear end of the casing within the outlet 12 of the casing in the converging end wall 13 and centrally of the casing and through which material the purified gases delivered from the container into the chamber of the casing C are adapted to pass and thereby be filtered. The filtering material is confined within the casing between a pair of foraminous walls or partitions or wire mesh 14, 15, and access to the space between the partitions or walls 14, 15 for filling the material into such space and for substituting or renewing such material is through an opening in the top of the casing C having a removable closure, as at 16.

A main conduit 17 is extended into the casing C through the forward end wall above the container 6 and is adapted to be connected to the outlet of an internal combustion engine for the products of combustion, or constitute a continuation of the exhaust pipe usually connected to said outlet. The end of the conduit 17 within the casing C is flared laterally to arrange the same of increased width and of decreased cross sectional area, as at 18. A plurality of branch conduits 19, shown in the present instance as eight in number, although a greater or less number may be used, are connected in communication with the flared end 18 of the conduit 17 to divide the stream of gases delivered through the conduit 17 into a plurality of streams having a combined volume substantially equal to the volume of the stream of the gases delivered through the conduit 17. The branch conduits 19 are each bent at a right angle to extend to adjacent the bottom of the casing C at the rear end of the container 6 and then reversely turned upon themselves to U-shape to extend parallelly of the end upstanding wall of the container 6 to adjacent the top thereof, as at 19', and then bent laterally at an angle, as at 19'', and extended through the wall of and in communication with the container 6 above the level of the solution therein, the extremity of said end portions 19'' being arranged to open to the container 6 in a downward direction to the top of the material therein, as clearly shown in Figure 2. Each of the portions 19' of the branch conduits 19 is connected in communication with the container 6 to by-pass the material from said container 6 to said portions 19' of the branch conduits, and shown as arranged adjacent the juncture of said portions 19' with the return bend of the branch conduits 19 and communicating with the container 6 adjacent the bottom thereof, said connecting means comprising a pipe 20 for each branch conduit 19 secured at one end in an opening in the wall of the container 6 and the opposite end secured in an opening in the portions 19' of the branch conduits 19 and having an elbow arranged within said portion of the conduits 19 to open upwardly therein, as clearly shown in Figure 4, whereby the flow of the gases through the branch conduits 19, 19' past the outlet of said elbows will cause the same to contact and mix with the solution passing from the container 6 through the pipes 20 into the conduits 19 entrained with the gases through the branch conduits into the top of the container 6.

In operation the gases of the products of combustion exhausted from an internal combustion engine pass through the main conduit 17 and by the connection 18 thereof with the branch conduits 19 the gases delivered through and from the main conduit 17 are divided or separated into a plurality of streams into the branch conduits 19. During the period of idleness the material in the container 6 will flow from said container through the connections 20 into the branch conduits 19, 19' to a level substantially the same as the level of the material in the container, and the gases delivered into the branch conduits will force such material in the branch conduits forward thereof outward into the top of the container 6, and during the continuance of the operation of the engine there will be a continuous by-passing of the solution from the container through the connections 20 to the branch conduits and the delivery thereof from the branch conduits with the gases into the container 6, the passage of the solution from the container 6 into the branch conduits causing the gases to contact and mix therewith with the result that it will absorb noxious and toxic constituents of the gases. The gases discharged into the container 6 are delivered through the outlet thereof into and expanded in the chamber of the casing C between the container 6 and the wall of fibrous filtering material 11 and discharged from the casing C through the foraminous walls 14, 15 and fibrous filtering material 11 and delivered through the outlet 12, the material 11 serving as a filter for and filtering the gases in their passage therethrough.

By the arrangement of flaring the end of the conduit 17 and connecting the branch conduits 19 thereto which have a combined area or capacity substantially equal to the area or capacity of the conduit 17 no back pressure will develop that would tend to retard or impede the discharge of the gases exhausted from the engine into the reaction chamber 6, and by the arrangement of dividing the main stream of gases delivered by the conduit 17 into a plurality of smaller streams and delivering the same through a plurality of branch conduits there is produced a greater cooling surface and there is an effective cooling of the gases before they are discharged into the reaction chamber 6 and a corresponding retarding of a rise in the temperature of the solution in said chamber. Also by connecting the branch conduits to the container to by-pass the purifying liquid to the branch conduits to subject the gases passing therethrough to the action of the purifying liquid and entrain the purifying liquid with the gases and discharge the same into the container above the liquid therein, there is effected a separation of the purifying liquid from the gases in their passage through the container to the container outlet, the purifying liquid separating by gravity from the gases with the result that practically all of the purifying liquid is separated from the gases before they pass out of the container outlet.

While there is illustrated and described one embodiment of the invention it will be obvious that various modifications may be made in the construction and arrangement of parts without departing from the scope of the invention, and that portions of the invention may be used without others and come within the scope of the invention.

Having described my invention, I claim:

1. In means for purifying the exhaust gases of combustion of internal combustion engines, a casing having an outlet in one end, an angle partition extending transversely of and co-operating with the opposite side walls, bottom and end wall of the casing opposite the end wall with the outlet to form a container in the casing containing a gas purifying liquid in quantity less than the capacity of the chamber and having an outlet at one end from above the purifying liquid into the end of the casing opposite the casing outlet, a main conduit adapted to be connected to the exhaust outlet of an engine extended into the casing above and parallelly of the container, branch conduits connected to the main conduit in the casing extended downwardly to adjacent the bottom of the casing at the end of the container and then bent reversely to U shape to extend upwardly parallelly of the downwardly extending portion and then extended laterally into the container above the purifying liquid, pipes connecting each branch conduit adjacent the reverse bend to the container to by-pass the purifying liquid from the container to the branch conduits to act on the gases in their passage through the branch conduits to the container, said liquid being entrained and delivered with the gases into the container above the liquid and the liquid separating by gravity from the gases in their passage from the container to the container outlet, and a filtering member extending transversely of the casing between the outlets of the casing and the container into the casing through which the gases are adapted to pass to the casing outlet to filter the gases.

2. In means for purifying the exhaust gases of combustion of internal combustion engines, a casing, means arranging the casing with a pair of chambers, one chamber constituting the major portion of the casing having an outlet centrally at one end of the casing and the other chamber arranged at the bottom of the casing and containing a purifying liquid for said gases in quantity less than the capacity of the chamber and having an outlet leading from adjacent one end of the chamber above the liquid therein into the end of the first chamber opposite the outlet, a conduit adapted to be connected to the exhaust outlet of an engine extended into the first chamber above the liquid carrying chamber with the end within said chamber flattened and flared laterally of the chamber, a plurality of branch conduits connected at one end to the flattened and laterally flared end of the first named conduit and connected at the opposite ends to the end of the liquid carrying chamber opposite the end with the outlet above the liquid and arranged with an intermediate portion disposed in the first chamber in a plane below the level of the liquid in the liquid carrying chamber, and pipes connected to and in communication with the liquid in the liquid carrying chamber and said intermediate portion of each branch conduit to by-pass the liquid from the liquid carrying chamber to each of said branch conduits to mix with the gases in their passage through the branch conduits and be entrained and returned by the gases to the liquid carrying chamber, and means in the first chamber between the outlet of said chamber and the outlet of the liquid carrying chamber adapted for the passage of the gases therethrough from the first chamber to the outlet thereof and to filter the gases.

3. Means for purifying the exhaust gases of combustion of internal combustion engines as claimed in claim 2, wherein the liquid carrying chamber is arranged at the forward end of the casing and the branch conduits connected to the main conduit are extended downward in the rear of the liquid carrying chamber to adjacent the bottom of the casing and bent reversely to U shape and extended into the liquid carrying chamber above and opening to the top of the liquid therein, and the pipes connecting the liquid carrying chamber with the branch conduits are connected to the reversely U shaped bends of said branch conduits.

4. In means for purifying the exhaust gases of combustion of internal combustion engines, a casing having an outlet in one end, a transverse partition separating the casing into a pair of chambers, one chamber being in communication with the outlet and the other chamber arranged at the bottom and end of the casing opposite the outlet and containing a purifying liquid for the gases in quantity less than the capacity of said chamber, and said liquid chamber having an outlet adjacent one end from above the liquid opening into the end of the other chamber opposite the casing outlet, a conduit extended through the end of the casing opposite the outlet into the first chamber above the liquid chamber adapted to be connected to and receive the exhaust gases of combustion in a single stream from an engine, and having a plurality of outlets at the end in the first chamber, a branch conduit connected to each outlet of said conduit and the end of the liquid chamber opposite the outlet therefrom to admit said gases in a plurality of streams into the liquid chamber, and pipes connected to and in communication with the liquid in the liquid chamber and the branch conduits intermediate the ends to by-pass the purifying liquid from the container to each of the gas streams in their passage through the branch conduits to the liquid chamber to subject the gases to the action of the purifying liquid, said liquid being entrained with the gases to the liquid chamber and separated by gravity from the gases in the liquid chamber in the exiting of the gases through the liquid chamber from the outlet thereof into the first chamber, and filtering means for the gases extending transversely of the casing between the outlet of the liquid chamber and the casing outlet.

EDWARD F. HENNESSY.